(Model.)  3 Sheets—Sheet 1.

R. E. DAVISON.
Signal Attachment for Mariners' Compass.

No. 243,224.  Patented June 21, 1881.

Witnesses
S. N. Piper
Wm W. Lunt

Inventor
Royal E. Davison
by R. H. Eddy atty

N. PETERS, Photo-Lithographer, Washington, D. C.

(Model.)
R. E. DAVISON.
Signal Attachment for Mariners' Compass.
No. 243,224. Patented June 21, 1881.
Fig. 4.
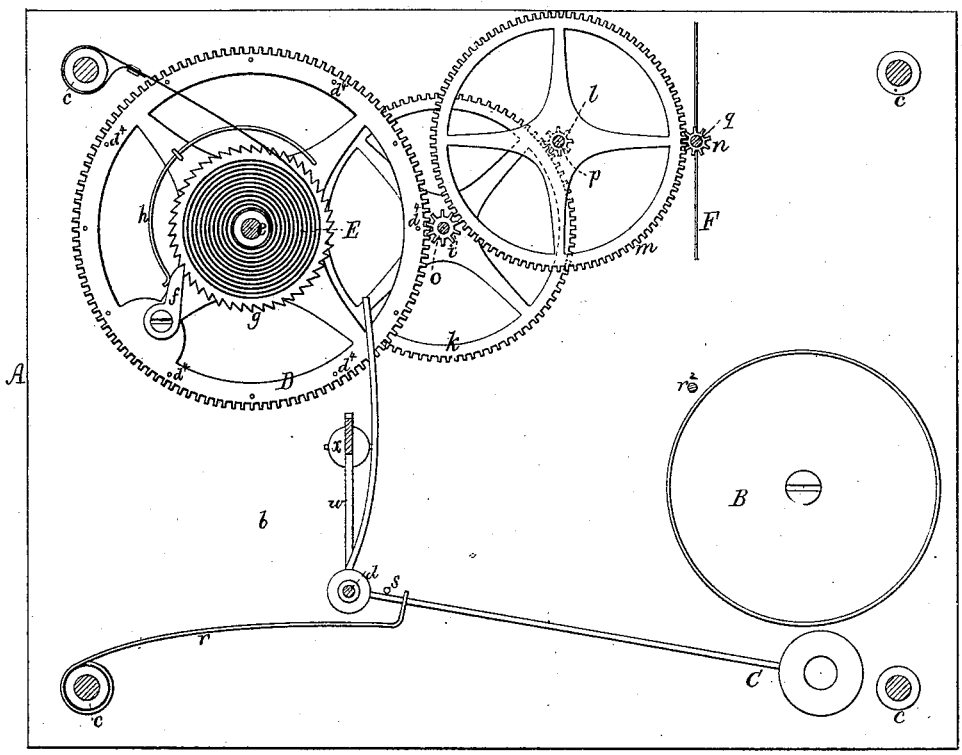
Fig. 5.
Fig. 7.
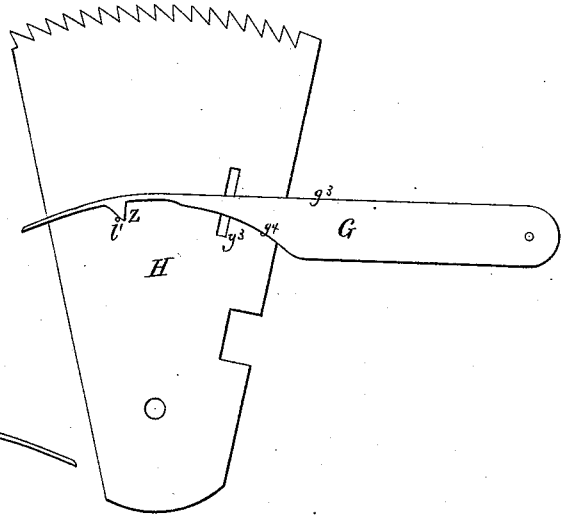
Fig. 6.
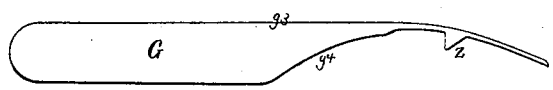
Witnesses.
Inventor.
Royal E. Davison
by R. H. Eddy atty.

(Model.)
3 Sheets—Sheet 3.

R. E. DAVISON.
Signal Attachment for Mariners' Compass.

No. 243,224. Patented June 21, 1881.

Witnesses.
S. N. Piper
E. B. Pratt

Inventor.
Royal E. Davison.
by attorney
R. H. Eddy

UNITED STATES PATENT OFFICE.

ROYAL E. DAVISON, OF NORTHAMPTON, MASSACHUSETTS.

SIGNAL ATTACHMENT FOR MARINERS' COMPASSES.

SPECIFICATION forming part of Letters Patent No. 243,224, dated June 21, 1881.

Application filed July 26, 1880. (Model.)

*To all whom it may concern:*

Be it known that I, ROYAL E. DAVISON, of Northampton, of the county of Hampshire and State of Massachusetts, have invented a new and useful Improvement in Apparatus for Giving Audible Signals, the same being a Signal Attachment for a Mariner's Compass; and I do hereby declare the same to be described in the following specification, and represented in the accompanying drawings, of which—

Figure 1:
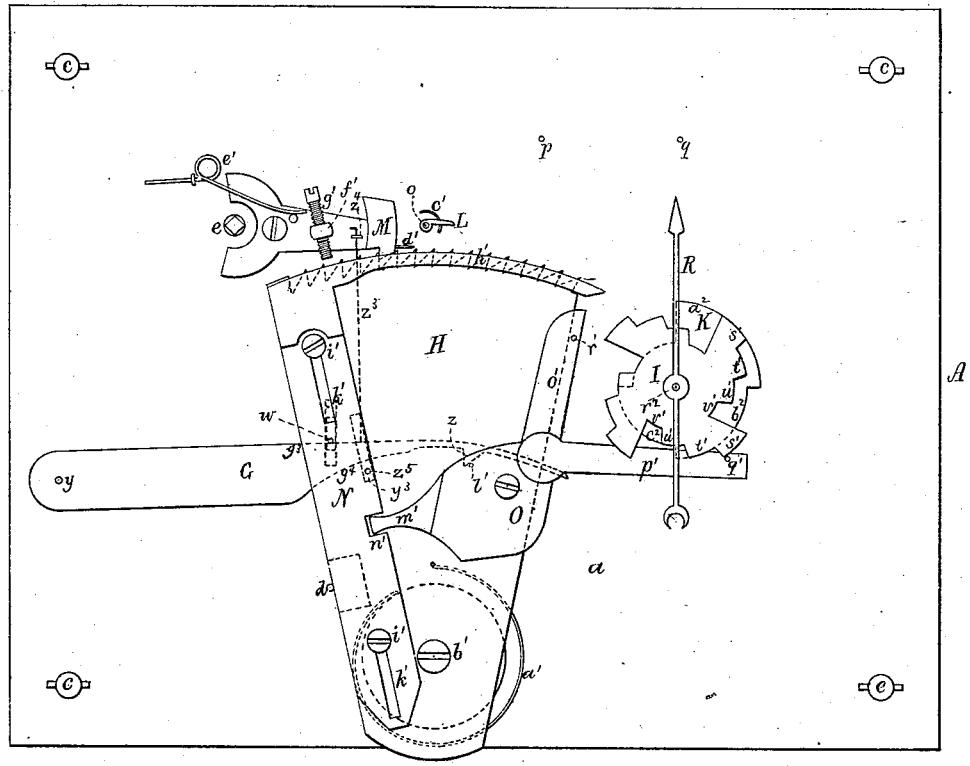
Figure 2:
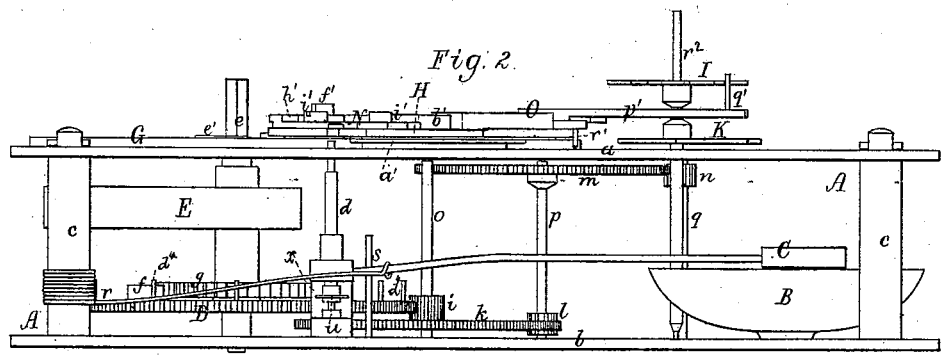
Figure 3:
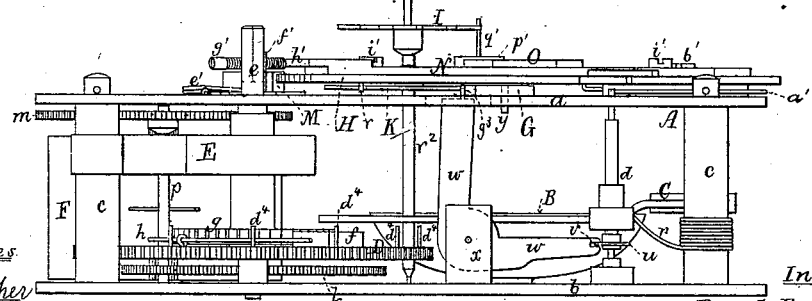
Figure 8:
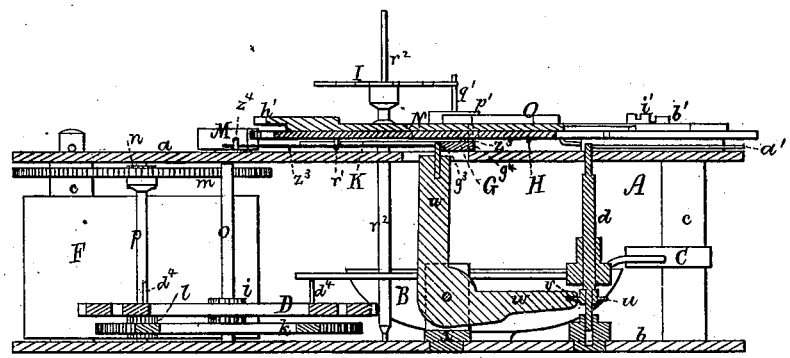

Figure 1 is a top view, Fig. 2 a front elevation, and Fig. 3 an end view, of a signal apparatus of my improved kind. Fig. 4 is a horizontal section of it, taken so as to represent the parts of the apparatus which are beneath the upper plate of its frame. Fig. 5 is a top view of the lower "snail." Fig. 6 is a top view of the "tripping-arm," Fig. 7 being hereinafter explained. Fig. 8 is a transverse section of the apparatus, taken through the knee-lever $w$ and shaft $d$.

As shown in the drawings, the apparatus is designed to strike its bell at intervals to indicate to a navigable vessel at sea and in a fog the course on which another such vessel carrying the apparatus may be sailing. If we suppose the cardinal points of the mariner's compass to be respectively represented by the cardinal numbers 1, 2, 3, and 4—that is, if 1 is to denote north, 2 east, 3 south, and 4 west—and if we also suppose each quadrant of the compass to be divided into a given number of equal parts, (as eight, for instance,) suitably numbered, the course north by east would be represented by the number 11, the course north northeast by 12, and northeast by north by 13, northeast by 14, northeast by east by 15, east northeast by 16, and east by north by 17. To signalize the course north northeast the apparatus will sound the bell once to indicate north, and after a proper pause will strike the bell twice, thus giving the number 12, representing north northeast.

As the course may vary the apparatus will automatically indicate it, and at regular intervals of time will repeat the number designatory of the course while the vessel may continue sailing thereon. To do this, however, the magnetic needle or compass-card becomes an essential element of the invention in full; but without the magnetic needle or compass-card to rotate the snails by the force of magnetic attraction the apparatus may still be used as a signalizer, manual or other power being used to effect the necessary movements of the snails. The lower of these snails is to govern the number of strikings of the bell for the tens in the number to be signaled, the number of strikings of the bell for the unit of the number being governed by the upper snail, as will be hereinafter more particularly explained.

Thus it will be seen that the apparatus first strikes the bell the number of times indicative of the first figure of a number consisting of two figures, and after a sufficient pause it again strikes the bell the number of times indicative of the second figure of the number to be signaled, all of which it continues to repeat again and again so long as its motor or main-spring may be in action.

The nature of the invention is defined by the claims hereinafter presented.

In the drawings, A denotes the frame for supporting the main operative parts of the apparatus, such frame being composed of two parallel plates, $a$ $b$, and four connecting-posts, $c$, arranged as represented. To the lower plate of the frame an inverted bell, B, is fixed, its hammer being shown at C. The latter projects from a shaft, $d$, adapted to revolve in its bearings, as well as to slide vertically therein.

A pin-wheel for actuating the hammer is shown at D, it being a horizontal gear furnished with a series of pins, $d^4$, extending up from it in a circular path at regular distances apart. It revolves on a vertical arbor, $e$, and carries a pawl, $f$, to engage with a ratchet-wheel, $g$, fixed on the arbor, the pawl being pressed up to the ratchet-wheel by a spring, $h$. A volute spring, E, having its inner end fixed to the arbor $e$, has its outer end fixed to one of the posts $c$. The gear D engages with a rotary fan, F, by means of an intervening train of gears, $i\ k\ l\ m\ n$, fixed on their upright arbors $o\ p\ q$, arranged as shown.

The hammer of the mechanism for sounding the bell has a return-spring, $r$, applied to it and one of the posts, the longer arm of the hammer bringing up against a vertical post or stop, $s$, when the hammer-head is above the bell. The apparatus for sounding the bell at regular intervals therefore consists of the hammer and the pin-wheel, the mechanism for revolving the latter, such mechanism being the volute spring, the winding-arbor, and ratchet-wheel and pawl, and the rotary fan and its train, all of which is what is common in clocks of various kinds. The shaft of the hammer carries a small wheel or disk, $u$, which projects into a notch, $v$, in the lower arm of a knee-lever, $w$, fulcrumed to the post $x$. The upper arm of the lever $w$ extends up through an aperture in the upper plate of the frame A, and rests against the edge $g^3$ of what I term the "tripping-arm" G, as shown in Figs. 1, 3, and 8, such arm being arranged on the said upper plate and pivoted thereto, the pivot being situated at $y$. The said arm is provided with a tooth or triangular projection, $z$, as represented.

Extending over and across the tripping-arm G is a toothed sector, H, that is pivoted to the upper plate and provided with a spring, $a'$, to move it (the said sector) toward the two snails I K, as occasion may require, the pivot of the sector being shown at $b'$.

To operate with the toothed arc of the sector is a small tooth, L, which is fixed upon the arbor $o$. This tooth has a curved arm, $c'$, projecting from it, as shown, such arm being to act with a stud, $d'$, extending from a retaining-pawl, M, pivoted to the upper plate and formed and arranged as shown. A spring, $e'$, forces the pawl toward the sector. The pawl has a post, $f'$, extending from it and carrying a screw, $g'$, which, screwed through the post, abuts against the upper edge of the curved arm $h'$ of the pawl-actuator N, formed as represented, and adapted to slide on the sector, with which it is connected by screws $i'$ going through slots $k'$ in the said actuator.

Projecting up from the pawl M is an eye, $z^4$, through which passes loosely a wire, $z^3$, said wire being connected with the tripping-arm G. (Shown in Figs. 1 and 8.) When the arm G is moved toward the pawl M the wire will slide through the eye without moving the pawl; but when the said pawl is moved by the actuator N sufficiently for the curved arm $c'$ to act against the stud $d'$ the arm G will have been moved with the pawl by the eye $z^4$ thereof coming in contact with the hooked end of the wire $z^3$, and said arm G will be held in that position until the arm $c'$ shall have released the stud $d'$ and permitted the pawl to return to the teeth of the sector. There projects down from the actuator N a pin, $z^5$, which, passing through a slot, $y^3$, in the sector H, is to operate against the edge $g^4$ of the tripping-arm G. (Shown in dotted lines in Fig. 1.) There extends down from the sector a stud, $l'$, it being shown in Fig. 7, which is an under-side view of the said sector and the tripping-arm G. Furthermore, there is fulcrumed to the sector, and arranged therewith, as shown, a tri-armed lever, O, one of whose arms—viz., that marked $m'$—extends into a notch, $n'$, made, as shown, in the actuator N. Between the arms $o'$ $p'$ of the said lever are the two snails I K, a top view of the lower one, K, being shown in Fig. 5. From the arm $p'$ a stud, $q'$, extends upward, while from the other arm a stud, $r'$, extends downward, the latter stud being to operate with the lower snail, and the other stud with the upper snail.

The said snails are fixed on a single arbor, $r^2$, pivoted in the frame, and carrying a magnetic needle or a compass-card, (R being one,) the snails being free to revolve with such needle or compass-card as it may be turned about by magnetic attraction, or as the ship or navigable vessel may change her course. The lower snail, formed as shown, with four stops, $a^2$ $b^2$ $c^2$ $d^2$, allows the sector to fall back a distance equal to one, two, three, or four movements of it by its operative tooth, in order for the bell to be sounded once, twice, three, or four times, as the course may be north, east, south, or west. The upper snail has in each quadrant of it a series of four or other suitable number of steps, $s'$ $t'$ $u'$ $v'$. If, now, we suppose a vessel having the apparatus on board to be steering on a course, we there find that the snails will be in positions to cause the sector at each falling back of it to move only far enough for the necessary number of strokes on the bell to be given during the next advance of the sector, such necessary number being that indicative of the first figure of the number indicative of such course. While the sector is intermittently advancing the stud that projects down from it will be forced against the tooth $z$ of the tripping-arm G, whereby such arm will be moved against the upper arm of the knee-lever $w$, and will cause such lever to be so moved as to force the hammer upward above the bell and the pins of the pin-wheel. This insures the necessary pause between the striking of the ten and the striking of the unit of the number indicative of the course. Of course the bell, when the hammer is in such position, will not be struck by the hammer when in movement. One object, therefore, of the stud $l'$, the tripping-arm G, and the knee-lever is not only to produce the pause stated, but to raise or force upward the hammer, so that it may not strike the bell during the time required to effect the release of the retaining-pawl M from the sector in order to admit of the latter falling back.

Another object is to cause a sufficient interval of time to elapse between the completion and repetition of the signal. After the number of strikings of the bell indicative of the ten-figure of the course may have been accomplished, and the necessary pause taken place prior to the striking of the number indicative of the unit-figure of the course, the latter number will be struck. On this taking place the upper stud of the tri-armed lever will be in contact with its snail, and the release of the pawl from the sector will follow. This release of the pawl is effected during advance of the sector, and after the upper pin of the tri-armed lever O may have been carried into contact with the upper snail. The sector continuing to advance, the tri-armed lever will be moved on its fulcrum so as to force the actuator N against the screw $g'$, and consequently cause the pawl M to be moved out of engagement with the sector, the pawl, while the sector is falling back, being kept out of engagement with it by the curved arm $c'$ and the stud $d'$. The stud falling on the arm will keep the pawl away from the sector until the arm may have passed by the stud.

To illustrate more clearly we will now suppose a vessel to be sailing on the north northeast course, which course may be represented by the number 12, and it becomes necessary, on account of fog or darkness, to indicate to another vessel the course on which we are sailing. The apparatus being in proper position to indicate the above course as follows—viz., the pin $r'$ of the tri-armed lever O will be resting against the step $a^2$ of the snail K, and the sector H will be against the pin $r'$. We will now suppose the apparatus to be set in operation, the arbor $o$ commences to revolve and carries the tooth L against a tooth of the sector H, and moves the said sector on its pivot the space of one tooth to the left. While this has been going on one of the pins, $d^4$, of the wheel D has been carried against the tail of the hammer C, and has caused it to strike the bell one blow, which will indicate the first or ten-figure of the course. The next revolution of the tooth L, and the corresponding movement of the sector H, will have brought the stud $l'$ of said sector against the tooth $z$ of the tripping-arm G, and have moved said arm against the upper end of the knee-lever $w$. Said lever $w$ will have been turned on its fulcrum, and by means of the notch $v$ and disk $u$ will have raised the shaft $d$, and thereby the hammer C, above the bell, and will thus have produced the desired interval of silence before the commencement of the remaining two blows, representing the second or unit figure, of the signal to be struck. The stud $l'$ having passed off the tooth $z$ will no longer sustain the hammer in its raised position, but allow it to drop to its former position. The two next revolutions of the tooth L, and the corresponding movements of the sector H, will cause the hammer to strike the bell two blows, which will indicate the second or unit figure of the course above mentioned. The pin or stud $q'$ of the tri-armed lever O, which, as the sector has been turned on its pivot, has been advancing toward the arbor $r^2$, will now have been brought against the proper step—$t'$ for instance, of the snail I—which will stop said stud in its movement toward the arbor $r^2$, and any subsequent movement of the sector H will turn the said lever O on its fulcrum. The first revolution of the tooth L, and corresponding movement of the sector H, after the said stud $l'$ has come against the step of the snail I, will cause the lever O to move the actuator N, when its pin $z^5$, acting against the edge $g^4$ of the tripping-arm G, will, through the intervening mechanism hereinbefore referred to, raise the hammer as it was previously raised by the stud $l'$ and tooth $z$, and will prevent the further striking of the bell, as before. A subsequent revolution of the tooth L and movement of the sector H will cause a further movement of the actuator N by the lever O, and the arm $h'$ of the actuator, striking against the screw $g'$, will move the pawl M sufficiently to bring the stud $d'$ into the path of the curved arm $c'$, which arm, continuing to revolve, will further move and hold the pawl M out of the path of the sector-teeth a sufficient length of time for the spring $a'$ to cause the sector to return to the proper position for a repetition of the signal. As soon as the stud $d'$ is released from the arm $c'$ the pawl M will return to the sector-teeth.

When, during the return of the sector, the stud $r'$ of the lever O strikes the stop $a^2$ of the snail K the movement of the said stud $r'$ toward the arbor $r^2$ is stopped, and the sector continues to move toward the snail until it is stopped by the stud $r'$. During the retreat of the sector the actuator N has been returned to its former position through the reverse motion of the lever O, which occurred when the stud $r'$ struck the step $a^2$ of the snail K, and the tooth $z$ of the tripping-arm G has also been held out of the path of the stud $l'$ by the eye $z^4$ of the pawl M, acting against the hooked end of the wire $z^3$, while said pawl was held out of action with the sector-teeth by the stud $d'$ and the arm $c'$. The apparatus is now in a position to repeat the signal, and will continue so to do so long as the vessel continues to sail on said north northeast course; but should the course of the vessel be changed to northeast by north, for instance, which may be represented by the number 13, it is plain to see that the stud $r'$ will still be at the same distance from the arbor $r^2$—viz., on the step $a^2$—and the apparatus being in operation the tooth L will move the sector the same distance, as before, and one blow on the bell will be struck for the first or ten figure of the signal, and then the hammer will be raised by the stud $l'$ and tooth $z$, and the interval of silence will follow. The stud $l'$ having passed the tooth $z$ the hammer will fall, and the position of the apparatus relatively to the snails having been changed, so that the stud $q'$ of the lever O can advance one step nearer to the arbor $r^2$ than before, (to the step $u'$ of the snail K, for instance,) the tooth L will make three revolutions instead of two, the sector will be correspondingly moved, as before, and three blows on the bell will have been struck when the stud $q'$ reaches the step $u'$. Then the sector will be returned to its position against the stud $r'$, as in the former case. Now, suppose the course of the vessel to be changed to east by south, which course may be represented by the number 21, it will be seen that the position of the apparatus with relation to the snails will have been changed, so that the stud $r'$ of the lever O will be against the step $b^2$ of the snail K, and therefore one step nearer to the arbor $r^2$ than heretofore. The apparatus being in operation, the tooth L will make two revolutions, and advance the sector correspondingly, and the bell will be struck two blows before the hammer is raised by the stud $l'$ and tooth $z$. The stud $l'$ having passed the tooth $z$ the hammer will fall, and the tooth L will make but one revolution, and will advance the sector the space of but one tooth before the stud $q'$ of the lever O reaches the step $s'$, for instance, of the snail I, or two steps farther away from the arbor $r^2$ than before. Thus it will be seen that in the latter case the bell will be struck but one blow before the sector is returned to its starting-point. Thus it will be seen that the apparatus will continue to automatically indicate the course of a vessel as long as it may be necessary or desirable to do so.

I claim as my invention as follows, viz:

1. A combination consisting of the following-named mechanical elements adapted and to operate substantially as described, viz: first, the bell and its striking mechanism; second, the knee-lever $w$; third, the tripping-arm G, with its tooth $z$; fourth, the toothed sector H, with its stud $l'$; fifth, the spring $a'$; sixth, the rotary tooth L, with its curved arm $c'$; seventh, the retaining-pawl M and its spring $e'$, post $f'$, screw $g'$, and stud $d'$; eighth, the actuator N; ninth, the tri-armed lever O, with its studs $q'$ $r'$; tenth, the two snails I K and their arbor.

2. The combination consisting of the following mechanical elements, adapted and to operate substantially as described, viz: first, the magnetic needle or compass-card applied to the arbor of the two snails; second, the two snails and their arbor; third, the triangular lever O, with its studs $q'$ $r'$; fourth, the actuator N; fifth, the retaining-pawl M, with its spring $e'$, post $f'$, screw $g'$, and stud $d'$; sixth, the rotary tooth L, with its curved arm $c'$; seventh, the spring $a'$; eighth, the toothed sector H, with its stud $l'$; ninth, the tripping-arm G, with its tooth $z$; tenth, the knee-lever $w$; eleventh, the bell and its striking mechanism.

3. The combination of the two snails with the toothed sector, the retaining-pawl, the tri-armed lever, and the actuator, all being applied and to operate substantially as set forth.

4. The combination of the curved arm $c'$ and the stud $d'$, with the rotary tooth L, the toothed sector H, and the retaining-pawl M.

ROYAL E. DAVISON.

Witnesses:
R. H. EDDY,
WM. W. LUNT.